United States Patent
Huber et al.

(10) Patent No.: US 8,412,180 B2
(45) Date of Patent: Apr. 2, 2013

(54) METHOD FOR GENERATING A SIGNAL TRAIN WHICH CAN BE PLAYED BACK ON A TESTER FOR TESTING A MOBILE RADIO

(75) Inventors: Rolf Huber, Fuerstenfeldbruck (DE); Stephan Sandhaeger, Germering (DE); Walter Schatz, Hoehenkirchen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 370 days.

(21) Appl. No.: 12/529,708

(22) PCT Filed: May 13, 2008

(86) PCT No.: PCT/EP2008/003818
§ 371 (c)(1), (2), (4) Date: Sep. 2, 2009

(87) PCT Pub. No.: WO2009/000368
PCT Pub. Date: Dec. 31, 2008

(65) Prior Publication Data
US 2010/0120416 A1    May 13, 2010

(30) Foreign Application Priority Data

Jun. 27, 2007  (DE) .......................... 10 2007 029 712
Feb. 21, 2008  (DE) .......................... 10 2008 010 288

(51) Int. Cl.
*H04W 24/00* (2009.01)
(52) U.S. Cl. ...................... 455/423; 455/425
(58) Field of Classification Search .................. 455/423, 455/425, 424; 701/114, 32.8, 29.8
See application file for complete search history.

(56) References Cited

U.S. PATENT DOCUMENTS

| | | | |
|---|---|---|---|
| 5,943,617 A | 8/1999 | Nakamura | |
| 6,819,924 B1 | 11/2004 | Ma | |
| 2002/0066011 A1* | 5/2002 | Vialen et al. | 713/150 |
| 2002/0089958 A1* | 7/2002 | Feder et al. | 370/338 |
| 2002/0183054 A1* | 12/2002 | Rimoni et al. | 455/423 |
| 2004/0093135 A1* | 5/2004 | Kang et al. | 701/29 |

FOREIGN PATENT DOCUMENTS
WO    95/15630 A1    6/1995

OTHER PUBLICATIONS
International Preliminary Report on Patentability dated Feb. 2, 2010, issued in corresponding International Application No. PCT/EP2008/003818, filed May 13, 2008.
"MT8510B Service Tester," User Manual, Anritsu Corporation 2005.

* cited by examiner

*Primary Examiner* — Charles Appiah
*Assistant Examiner* — Alexander Yi
(74) *Attorney, Agent, or Firm* — Christensen O'Connor Johnson Kindness PLLC

(57) ABSTRACT

The invention relates to a method for generating a signal train which can be played back on a tester for testing a mobile radio. First, a given command sequence is analyzed in respect of a signal train generated therefrom by the tester. The signal train which results from the command sequence is checked by comparing it with a standard-compliant signal train. Discrepancies between the standard-compliant signal train and the signal train resulting from the command sequence are detected and the necessary changes to the command sequence to generate a standard-compliant signal train are ascertained. In line with the necessary changes detected, commands or command sequence sections are supplemented and/or replaced. In this way, a command sequence which can be played back is generated and output.

7 Claims, 2 Drawing Sheets

Figure 1:
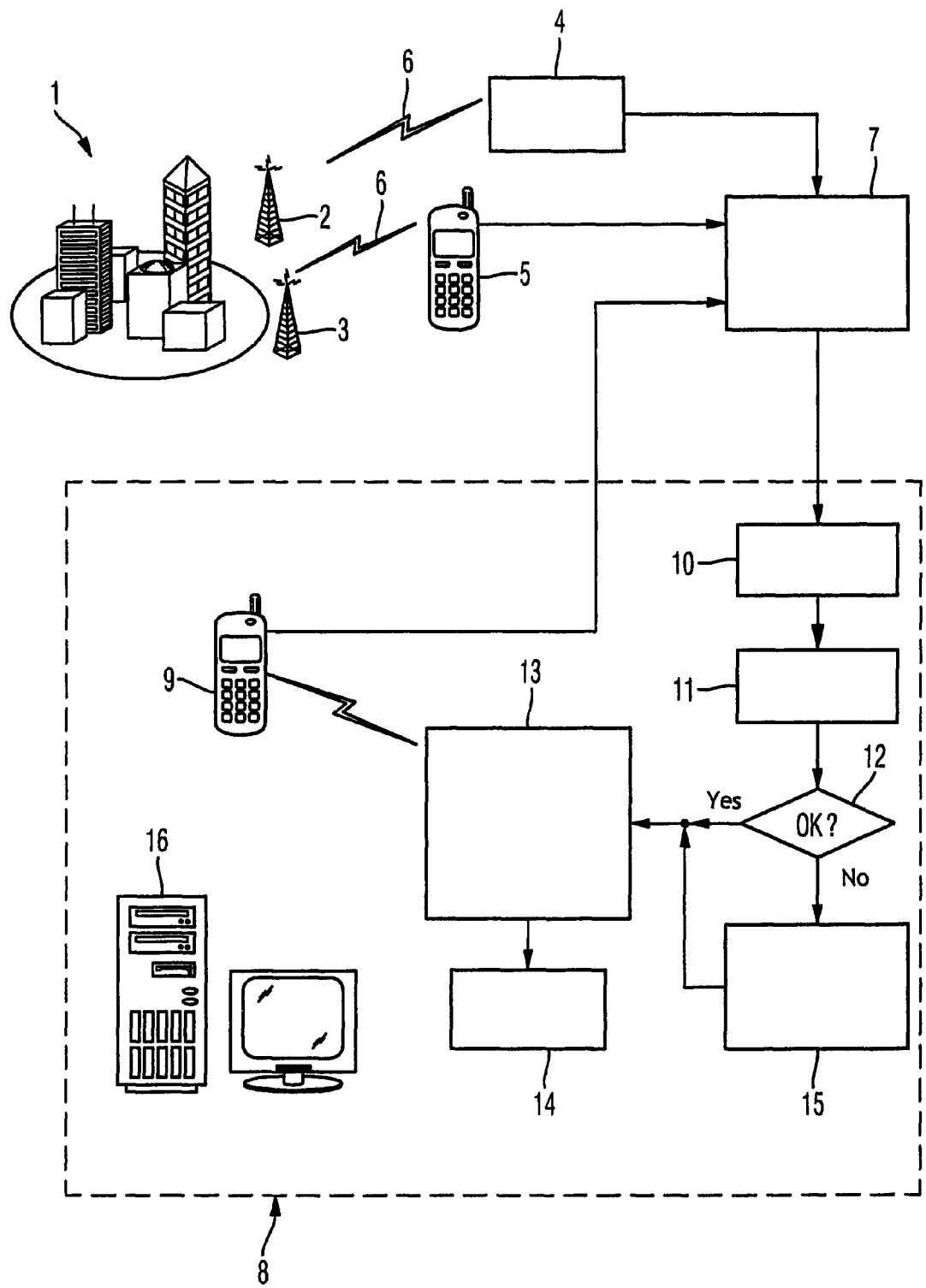

METHOD FOR GENERATING A SIGNAL TRAIN WHICH CAN BE PLAYED BACK ON A TESTER FOR TESTING A MOBILE RADIO

The invention relates to a method for generating a signal sequence capable of being played back on a test device for testing a mobile-telephone device.

In general, mobile-telephone devices are tested under laboratory conditions with regard to their performance in a radio network. For this purpose, the mobile-telephone devices are tested using a test device. This test device emulates a base station with a given mobile-telephone standard. Accordingly, signal sequences are generated by the test device, which, in the ideal case, correspond to a signal sequence generated in real operation and accordingly correspond to the transmitted signal from a base station. As a rule, these signal sequences are generated by programming a sequence of commands, and the test device generates the test signal on the basis of this command sequence. The command sequence therefore consists of control commands, which control the test device.

In order to allow a test, which is as close as possible to reality, the command sequence can also be generated from information, which is obtained from a real radio network or from a laboratory interoperability test. For this purpose, the communication with a base station communicating with the test mobile-telephone device according to a mobile-telephone standard can be recorded on a test run by means of a test mobile-telephone device. The information, which is obtained from the recorded signal sequences of the base station provides a basis for generating the command sequences for controlling the test device. However, in this context, it is problematic that the signals generated in real operation by the base station depend at least partially upon the test mobile-telephone device used for the recording. As a result, signals can also be recorded, which would not occur or which would occur in a different form when testing a different mobile-telephone device. Conversely, other mobile-telephone devices may require information, which the base station would communicate to them in the case of a standardised registration, but which are not triggered by the test mobile-telephone device. Within the meaning of the invention, a test mobile-telephone device or prepared mobile-telephone device is understood to mean a mobile-telephone device, which is capable of outputting via an interface information regarding messages transmitted between the base station and the mobile-telephone device and further information regarding the radio relay section.

The use of a signal sequence of this kind to generate the command sequence for controlling the test device would lead to a signal sequence generated by the test device, which allows no communication with the mobile-telephone device under test. The command sequence is therefore not capable of being played back within the meaning of the present invention, that is to say, it can lead to no communication or a defective communication between the mobile-telephone device under test and the test device.

The object of the present invention is therefore to provide a method for generating a signal sequence capable of being played back on a test device for testing a mobile-telephone device.

The object is achieved by the method according to the invention with the features of claim 1.

Initially, a command sequence, which is provided for playing back on the test device and therefore ultimately forms the basis for the signal sequence generated by the test device, is analysed. The analysis in this context is implemented with regard to the signal sequence generated by the test device. This signal sequence resulting from the command sequence is checked by comparison with a standardised signal sequence in order to identify any differences from a standardised signal sequence. In this context, the comparison can be limited to minimal requirements, which are defined by the standard and allow communication between the test device and the mobile-telephone device under test. Conversely, if differences between the standardised signal sequence and the signal sequence resulting from the command sequence are determined in this test, the necessary changes to the command sequence are derived from this. These changes, which are necessary, in order to obtain a command sequence, on the basis of which a standardised signal sequence is generated by the test device, are then implemented by supplementing missing commands or command-sequence segments and/or by replacing individual commands or command-sequence segments. Finally, a command sequence capable of being played back is therefore generated.

The dependent claims specify advantageous further developments of the method according to the invention.

The command sequence can, for example, be programmed. With programmed command sequences, which form the basis for the further analysis of the command sequence with the determination of missing commands or commands to be replaced, it is, in particular, possible to realise scenarios, which a real radio network shows only seldom. Conversely, according to an alternative, preferred embodiment, it can be advantageous to generate the command sequence from measured radio signals of a real radio network. In this context, the information necessary for imaging the radio network or the underlying laboratory conditions is recorded through a test run. For this purpose, for example, a network scanner and a prepared mobile-telephone device can be used, through which information is determined regarding the transmitted signals transmitted from base stations. Using a conversion device, a sequence of commands for controlling the test device is generated automatically from these determined data of the real radio network. The use of the method according to the invention is particularly advantageous in connection with real, recorded radio scenarios of this kind.

It is particularly preferred, if the command sequence provided for controlling the test device is checked to determine whether the command sequence leads upon execution to a signal sequence output by the test device, which contains a registration sequence for a mobile-telephone device. This is particularly advantageous, if only a time-limited interval for simulation is extracted from a recorded, real radio network. In such a case, the probability is high, that a registration of the mobile-telephone device under test or respectively of the test mobile-telephone device originally used in the recording is not contained in the selected sequence of signals. However, in this case, a check of the mobile-telephone device under test cannot be implemented, because the communication between the test device and the mobile-telephone device under test does not take place.

By preference, when the absence of a registration is identified, a corresponding command-sequence segment is automatically added and prefixed to the command sequence checked. Prefixing ensures that all of the commands provided for the course of the test are disposed after the registration of the mobile-telephone device under test and are therefore part of the test to be implemented.

Moreover, it is preferable to replace such commands or command-sequence segments of the command sequence, which relate to security algorithms used in the real network. In this context, the replacement is made by commands or command-sequence segments, which generate standardised test-signal sequences. The use of such standardised test-signal sequences, gives consideration to the circumstance that proprietary algorithms of the respective network operators are used in the recording. This relates in particular to different security algorithms. In order to implement a test at all, it is therefore necessary to replace the corresponding sequences of the command sequence with standard sequences. In determining the playback capability of a command sequence, the presence of such security algorithms is therefore checked, and the corresponding command sequence or command-sequence segment is replaced by a standard command-sequence segment.

For example, while a complete sequence for the registration of a mobile-telephone device is replaced in the case of a missing registration sequence, in the case of an existing registration sequence, only the contents of the individual commands may be replaced. These can relate, for example, to the code used for authentication. Within the meaning of the present invention, this is referred to as the replacement of a command.

Figure 2:
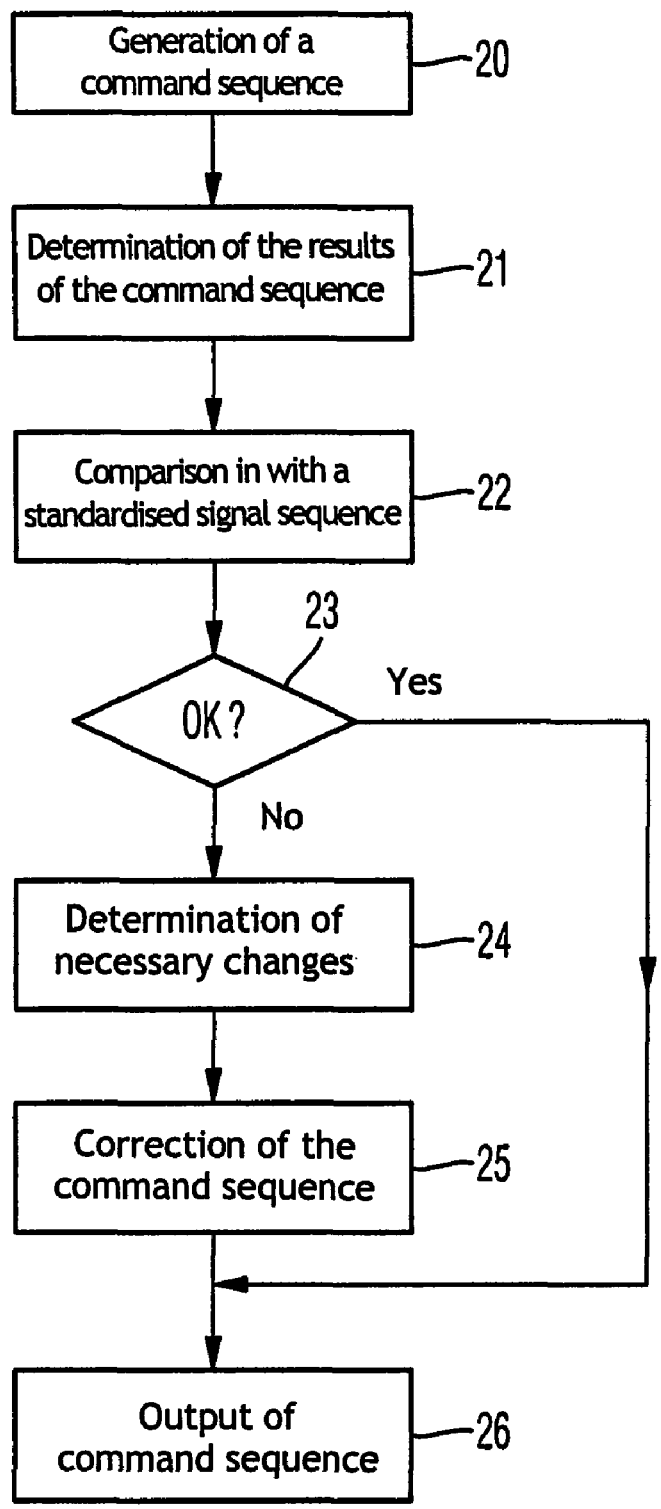

A preferred exemplary embodiment is illustrated in the drawings and described in greater detail below. The drawings are as follows:

FIG. 1 shows a schematic presentation explaining the course of testing for a mobile-telephone device using the method according to the invention; and FIG. 2 shows a much-simplified diagram of the course of the method according to the invention.

FIG. 1 shows schematically the preferred implementation of a test for mobile-telephone devices. A real environment 1 is initially used to obtain data, upon which the simulation of a radio network will subsequently be based. The real environment 1 contains several base stations 2, 3, wherein more than one base station is generally disposed at the same time within the reception range of a mobile-telephone device. Since mobile-telephone devices allow only a limited analysis of relatively-complex radio networks, the data regarding the radio network to be simulated is preferably recorded both with a network scanner 4 and also with a test mobile-telephone device 5. Both devices are connected to the base stations via a radio interface 6. The test mobile-telephone device 5 in this context is set up in such a manner that it is in regular operation with the base station 2 or respectively 3 and behaves within the radio network like a normal mobile-telephone device registered with the network. That is to say, a registration within the radio network is first required before data can be exchanged between the mobile-telephone device 5 and the base stations 2, 3.

By contrast, the network scanner 4 is connected to the base stations 2, 3 only in passive manner. It records data, which the functionally severely-limited reception components of mobile-telephone devices, cannot supply. For example, the network scanner 4 is also capable of determining very rapidly powers in frequency ranges disposed outside the frequency ranges used for the mobile-telephone connections, which the mobile-telephone device 5 uses.

The data of the network scanner 4 and of the mobile-telephone device 5 determined in this manner are first stored in a data acquisition unit 7. The data stored there provide information about radio signals emitted respectively from the base stations 2, 3 or also from other potentially-interfering transmitters. These radio signals consist of signal sequences. In this context, it must be particularly noted that the signal sequences can also contain such signal sequences, which contain in reaction to a response signal transmitted from the test mobile-telephone device 5.

The data and accordingly the information regarding the signal sequences transmitted from the base stations 2, 3 and regarding returned response signals of the test mobile-telephone device 5 are communicated to a conversion device 10. This conversion device 10 generates from the data or respectively the signal sequences, which also contain the information regarding response signals returned from the test mobile-telephone device 5, converts into a command sequence. In this context, only a part of the data, which were recorded in the test run, is generally used. These data are determined, for example, by selecting a time window of the test run. The conversion device 10 then also generates a command sequence only for this time interval. In the conversion, the commands for controlling the test device are brought into a format, which is readable by the test device. By preference, however, a command sequence should be generated from all of the recorded information. The choice of only one segment can then be implemented by selecting the part of the command sequence obtained through the preceding conversion.

The command sequence generated in this manner is checked with regard to its play-back capability by means of the checking device 11. A command sequence capable of being played back is understood in this context to mean a command sequence, which leads to a signal sequence to be generated by the test device, which is suitable for setting up and maintaining a standardised connection with the mobile-telephone device 9. In this context, the mobile-telephone device 9 is the mobile-telephone device under test and can therefore show reactions different from the reactions to the transmitted signals by comparison with the test mobile-telephone device 5.

In the checking of the command sequence through a checking device 11, the transmitted signal generated by the test device 13 on the basis of the commands is compared with a standardised transmitted signal of the same mobile-telephone standard. This check determines in particular whether the transmitted signal generated from the command sequence contains a registration sequence. A registration of this kind is initially required in order to set up a mobile telephone connection in the first place between the mobile-telephone device 9 under test and the test device 13.

The checking device 11 also checks the command sequence with regard to whether proprietary security algorithms are present, such as those occurring with the use of a given type of test mobile-telephone device 5 and a given SIM (subscriber identity module) when registering through a network operator. If such proprietary security algorithms are identified by the checking device 11, the relevant command-sequence segment is determined and replaced by an alternative command-sequence segment. This alternative command-sequence segment contains a standard algorithm, which is suitable in a non-specific manner for the implementation of a comparable security interrogation with every mobile-telephone device 9 under test. The mobile-telephone device 9 is also fitted with a standard SIM, in order to set up a connection with the test device 13 simulating the radio network. The use of the standard SIM prevents the mobile-telephone device under test from booking into a real network.

The checking of the signal sequence to be generated from the command sequence with a standardised signal sequence is illustrated schematically in FIG. 1 by the interrogation 12. If the interrogation 12 shows that all necessary commands and therefore all necessary components of the signal sequence are present, the command sequence is routed to the test device 13.

It is, of course, now also possible to store such a command sequence identified as capable of being played back and to supply it to the test device 13 at a subsequent time. The test device 13 is then in a position to generate transmitted signals on the basis of the command sequence and to communicate them to the mobile-telephone device 9 under test.

By contrast, if the interrogation 12 recognises that the command sequence is incomplete and, for example, the registration is missing from the transmitted signal generated from the command sequence, the commands or command-sequence segments still missing in the command sequence for the generation of a command sequence capable of being played back are determined in an analysis unit 15 and automatically added to the command sequence. In this manner, a command sequence capable of being played back, which is supplied from the analysis device 15 to the test device 13, is once again formed. A command-sequence segment is a plurality of associated commands, which occur in succession.

Such command-sequence segments can be stored in a pre-defined manner.

In a similar manner, the analysis device 15 determines whether given commands must be replaced. This has already been described above with reference to security algorithms. The selection of the commands responsible for the respective security algorithms or the corresponding transmitted signals is once again implemented in the analysis device 15. If such commands or command-sequence segments are identified by the analysis device 15, they are automatically replaced with standard commands or standard command-sequence segments. The command sequence revised in this manner and now capable of being played back is then once again supplied either to a buffer or directly to the test device 13.

Moreover, the test device 13 is connected to an evaluation device 14, through which the test result is determined. The reaction of the mobile-telephone device 9 can be registered through the test device 13 and the bi-directional connection set up with the mobile-telephone device 9 and supplied to the evaluation device 14 for further processing. As indicated by way of example by the schematically-presented computer device 16, the method according to the invention can preferably be implemented by means of a computer program.

FIG. 2 once again shows a simplified presentation of the course of the method according to the invention. Initially, in procedural stage 20, a command sequence is generated. In this context, the command sequence can be generated through a test run or by programming. The next stage 21 determines the result of this command sequence, which is obtained in the experiment of playing back the command sequence on the test device 13. The transmitted signal to be generated by the test device on the basis of the command sequence generated or the signal sequence is, so to speak, simulated. Following this, (stage 22), a comparison with a standardised signal sequence is implemented, that is to say, a transmitted signal, which is actually suitable for setting up a connection with the mobile-telephone device 9 under test. In stage 23, the agreement with such a standardised signal sequence is interrogated. If an agreement is present, the command sequence is output. By contrast, if it is established that the standard-signal sequence differs from the simulated signal sequence, the reason for the difference is determined. The changes to the command sequence necessary for the generation of a command sequence capable of being played back are determined (stage 24). The determination therefore finally delivers the commands or command-sequence segments, which must be added or replaced in order to obtain a command sequence capable of being played back, which corresponds to the standardised signal sequence.

The originally-generated command sequence is then corrected by supplementing the commands to be added as determined or by replacing the commands to be replaced as determined (stage 25), so that a command sequence capable of being played back is now present. This corrected command sequence, which is now capable of being played back, is also output in stage 26.

The invention is not restricted to the exemplary embodiment presented. In particular, individual features of the exemplary embodiment can advantageously be combined with one another.

The invention claimed is:

1. A method for generating a signal sequence which sets up and maintains communication between a test device and a mobile-telephone device under test comprising: analyzing a command sequence with a checking device with regard to a recorded signal sequence generated from the command sequence by the test device, the command sequence being generated automatically from measured radio signals of a real radio network, wherein the command sequence is analyzed by: comparing the recorded signal sequence resulting from the command sequence with a standardised signal sequence, determining differences between the standardised signal sequence and the signal sequence resulting from the command sequence, determining changes to the command sequence necessary in order to generate a standard-compliant signal sequence, adding and/or replacing commands of the command sequence corresponding to the determined, necessary changes, to generate a corrected command sequence capable of setting up and maintaining communication between the test device and the mobile telephone device under test; determining if the signal sequence resulting from the command sequence allows registration of a mobile telephone device; and prefixing to the command sequence a command-sequence segment that allows the registration of the mobile telephone device if the signal sequence resulting from the command sequence does not allow registration of the mobile telephone device under test.

2. The method according to claim 1, wherein the command sequence is initially programmed.

3. The method according to claim 1, wherein signal sequences of at least one base station in the real radio network are initially recorded by means of a test mobile-telephone device, and the command sequence is generated from the signal sequences transmitted from the at least one base station.

4. The method according to claim 1, further comprising: replacing commands and/or command-sequence segments of the command sequence generated from signals and/or signal sequences, which are related to security algorithms used in the real network, by commands and/or command-sequence segments, which generate standardised test-signal sequences.

5. The method according to claim 1, further comprising: adding to the command sequence commands necessary for running the corrected command sequence.

6. A computing device programmed with program-code stored on non-transitory medium that implements any one of method claims 1, 2, 3, 4, and 5 when the program is executed.

7. A non-transitory machine-readable medium having program-code stored thereon that is executable by a computing device in order to implement any of claims 1, 2, 3, 4, and 5.

* * * * *